Aug. 21, 1951 V. H. BUMGARDNER, SR 2,564,956
JAR LIFTER
Filed Oct. 9, 1947
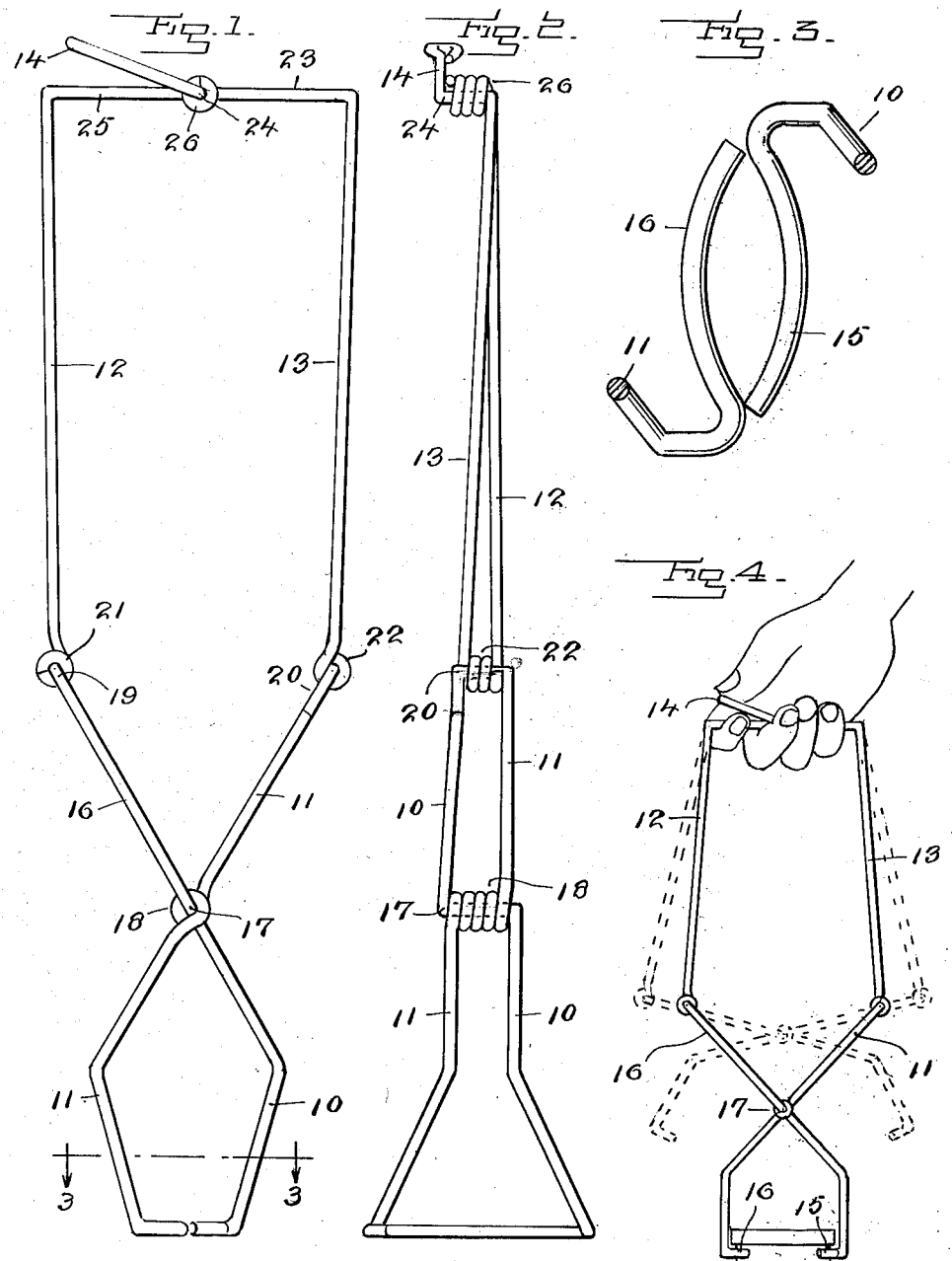
INVENTOR.
V. H. Bumgardner, Sr.
BY Victor J. Evans & Co.
ATTORNEYS Patented Aug. 21, 1951

2,564,956

UNITED STATES PATENT OFFICE 2,564,956

JAR LIFTER

Vernal H. Bumgardner, Sr., Medford, Oreg.

Application October 9, 1947, Serial No. 778,880

1 Claim. (Cl. 294—31)

This invention relates to tongs of the type used for picking up glass jars used in canning products in the home, and in particular a pair of pivoted levers with jar gripping ends and an upwardly extending handle having a lever therein for actuating the pivoted levers.

The purpose of this invention is to provide a lifter with positive gripping jaws and a handle with means for actuating the jaws in which the handle is remotely situated from the jaws to prevent steam from water into which the jars are placed and from which they are removed burning the hands.

Various types of tongs and lifting devices have been provided for removing jars of canned products from pressure cookers and boilers but where positive gripping means is provided the handles of the devices are comparatively short and it is difficult to remove the jars without burning the hands. With this thought in mind this invention contemplates jar gripping tongs with an extension handle in which means is provided in the handle for actuating the gripping jaws of the tongs.

The object of this invention is to provide means for providing an extension handle for jar gripping tongs wherein with the upper end of the handle held by hand the weight of a jar in jaws of the tongs urges the jaws together or in gripping relation with the jar held therein.

Another object of the invention is to provide an extension handle for jar gripping tongs wherein gripping jaws of the tongs may be opened by a lever of the handle.

A further object of the invention is to provide jar lifting tongs having an actuating extension handle which are of a simple and economical construction.

With the foregoing and other objects and advantages in view, the invention consists of the certain new and useful combination, construction, and arrangement of parts, as will be hereinafter more fully described, set forth in the claim appended hereto, and illustrated in the accompanying drawings, wherein:

Figure 1 is a view showing an end elevation of the tongs with the gripping jaws in the closed position.

Figure 2 is a view showing a front elevation of the tongs.

Figure 3 is a sectional plan through the lower end of the tongs taken on line 3—3 of Figure 1 illustrating the gripping jaws.

Figure 4 is a view similar to that shown in Figure 1 illustrating the tongs in use and showing the tongs with the jaws in the open position in dotted lines.

Referring now to the drawings wherein like reference characters indicate corresponding parts the jar lifting tongs of this invention include levers 10 and 11 pivotally connected intermediate of the lengths thereof and an extension handle comprising L-shaped arms 12 and 13 with the arm 13 provided with an actuating lever 14, and with the levers 10 and 11 provided with arcuate gripping jaws 15 and 16 respectively.

The lever 10 is formed with a cross bar 17 intermediate of the ends thereof and the lever 11 is provided with a coil 18 positioned around the cross bar 17 providing means pivotally connecting the levers, and the upper ends of the levers are provided with inverted U-shaped ends 19 and 20 on which coils 21 and 22 at the lower ends of the arms 12 and 13 are positioned providing pivotal connecting means between the handle and levers.

The upper end of the arm 13 is provided with a horizontally disposed section 23 having a cross bar 24 at the inner end thereof and the lever 14 extends from the end of the cross bar. The upper end of the arm 12 is provided with a similar horizontal section 25 and a coil 26 at the inner end of the section 25 is positioned around the cross bar 24 as shown in Figure 2.

With the parts arranged in this manner the upper end of the handle may be held by hand as illustrated in Figure 4 and by pressing downward with the thumb on the lever 14 the jaws will spread, as shown in Figure 4, so that the jaws may be readily placed over the neck of a jar, or a jar removed therefrom. The tongs may therefore, be used to pick up or set down a jar with the hand remotely situated from the jar.

The tongs may be made of wire or any suitable material and it will be understood that modifications may be made in the design or arrangement of the parts without departing from the spirit of the invention.

What is claimed is:

In a pair of jar carrying tongs the combination which comprises a pair of gripping levers having arcuate gripping jaws extended at right angles from the lower ends, one of said levers having a coil therein positioned intermediate of the ends and with the axis thereof in a plane parallel to a plane in which the arcuate gripping jaw on the end thereof is positioned, the other of said levers having a section intermediate of the ends thereof extended through and pivotally mounted in the coil of the other lever, and said section also positioned in a plane parallel to the plane through which the arcuate jaw on the end thereof is positioned, both of said levers having inverted U-shape upper ends, L-shape members having substantially parallel vertically disposed arms with horizontally disposed upper ends extended upwardly from the levers with coils on the lower ends of the arms pivotally mounted on the U-shape upper ends of the levers, and with a right angularly positioned section on the end of the horizontally disposed section of one arm pivotally mounted in a coil on the end of the horizontally disposed section of the other arm, and a thumb lever extended from the end of the said right angularly disposed section opposite to the end from which the said horizontally disposed section of the arm extends whereby the said arcuate gripping jaws are actuated to open positions by the said thumb lever.

VERNAL H. BUMGARDNER, Sr.

REFERENCES CITED

The following references are of record in the file of this patent:

UNITED STATES PATENTS

| Number | Name | Date |
|---|---|---|
| 526,559 | Burch | Sept. 25, 1894 |
| 718,790 | Pervier | Jan. 20, 1903 |
| 2,032,647 | Andrlik | Mar. 3, 1936 |

FOREIGN PATENTS

| Number | Country | Date |
|---|---|---|
| 8,479 | Sweden | Mar. 27, 1897 |